(12) United States Patent
Sims

(10) Patent No.: US 11,552,499 B2
(45) Date of Patent: Jan. 10, 2023

(54) POWER BACKUP FOR APPLIANCES

(71) Applicant: Robert Lee Sims, Cleveland, OH (US)

(72) Inventor: Robert Lee Sims, Cleveland, OH (US)

(73) Assignee: Robert Lee Sims, Cleveland, OH (US)

( * ) Notice: Subject to any disclaimer, the term of this patent is extended or adjusted under 35 U.S.C. 154(b) by 0 days.

(21) Appl. No.: 15/929,309

(22) Filed: Apr. 24, 2020

(65) Prior Publication Data

US 2020/0336005 A1 Oct. 22, 2020

Related U.S. Application Data

(63) Continuation-in-part of application No. 16/291,882, filed on Apr. 16, 2019, now abandoned.

(51) Int. Cl.
*H02J 9/06* (2006.01)
*G06F 1/26* (2006.01)

(52) U.S. Cl.
CPC ............. *H02J 9/062* (2013.01); *G06F 1/263* (2013.01)

(58) Field of Classification Search
CPC .... H02J 9/062; H02J 9/06; H02J 9/061; H02J 9/068; H02J 9/002; H02J 9/005; H02J 7/35; H02J 9/04; H02J 7/34; H02J 9/065; H02J 9/00; H02J 9/02; H02J 7/345; H02J 2207/20; H02J 7/0068; H02J 7/342; H02J 7/0063; H02J 3/14; H02J 7/02; H02J 9/066; G06F 1/263; G06F 1/30; G06F 1/28; G06F 1/26; G06F 1/266
USPC .......................................................... 307/66
See application file for complete search history.

(56) References Cited

U.S. PATENT DOCUMENTS

| | | | | |
|---|---|---|---|---|
| 2006/0179870 A1* | 8/2006 | Byrne | ..................... | F25B 27/00 62/408 |
| 2006/0260335 A1* | 11/2006 | Montuoro | ............... | F25D 29/00 62/236 |
| 2009/0045680 A1* | 2/2009 | Litch | ....................... | F25D 29/00 307/66 |
| 2012/0319486 A1* | 12/2012 | Polasek | ..................... | H02J 7/35 307/65 |
| 2016/0056666 A1* | 2/2016 | Choi | ....................... | H02J 9/062 307/66 |
| 2016/0076805 A1* | 3/2016 | Park | ....................... | F25D 21/002 62/151 |

* cited by examiner

*Primary Examiner* — John W Poos

(57) ABSTRACT

A backup power supply is provided. The backup power supply provides batteries electrically coupled to a power cord for receiving power for charging the batteries and a power outlet for transmitting power for powering electrical equipment coupled to the power outlet. An inverter generator is operatively associated with the power cord, the batteries, and the power outlet in such a way that when the power cord experiences an electrical short the batteries switch from a reserve mode receiving power to a backup mode for transmitting power to the power outlet. The invertor generator is also adapted to sense reception of power through the power cord so as to switch from the backup mode to the reserve mode. Visible and audible indicators are provided for indicating the switching between the reserve mode and the backup mode.

9 Claims, 3 Drawing Sheets

POWER BACKUP FOR APPLIANCES

CROSS-REFERENCE TO RELATED APPLICATION

This application claims the benefit of priority of U.S. non-provisional application Ser. No. 16/291,882, filed 16 Apr. 2019, as a continuing application, the contents of which are herein incorporated by reference.

BACKGROUND OF THE INVENTION

The present invention relates to power supplies and, more particularly, to a backup power source for appliances.

During extended power outages, food in refrigerators and freezers can spoil. Which is wasteful, to say the least. Current refrigerators and freezers are big enough as is, trying to maximize their volume for storing food, and so have no backup power source.

As can be seen, there is a need for a backup power source for appliances. The backup power source embodied in the present invention, eliminates the need to throw away spoil food during extended power outages. The backup power source, colloquially known as Redichill, provides users with a modified power system for powering refrigerator and freezers and is adapted to be automatically activated upon a power outage, ensuring food remains fresh even during extended power outages. The backup power source is portable and so can fit adjacent to the electrically coupled appliance, without diminishing the appliance's capacity to store food. In certain embodiments, the backup power source can be placed inside the appliance or installed therein.

SUMMARY OF THE INVENTION

In one aspect of the present invention, a backup power supply includes the following: at least one rechargeable battery; a power input (such as a power cord) electrically coupled to the at least one battery for power transmission thereto in a reserve mode; a power outlet electrically coupled to the at least one battery for power transmission therefrom in a backup mode; an inverter generator electrically coupled to the at least one battery; and the inverter generator configured to switch from the reserve mode to the backup mode if the power input is electrically shorted.

In another aspect of the present invention, the backup power supply further provides that the inverter generator is configured to switch from the backup mode to the reserve mode if the power input is electrically powered; an audio indicator operatively associated with the inverter generator to produce an audio indication when the backup power supply switches between the reserve mode and the backup mode; a visible indicator operatively associated with the inverter generator to produce a visible indication when the backup power supply switches between the reserve mode and the backup mode; a housing for the at least one battery and the inverter generator; and a display screen for representing the visible indicator, wherein the display screen is configured to representing a power transmission capacity of the at least one battery in the backup mode, wherein the display screen is configured to representing a time remaining until the power transmission capacity reaches a predetermined level; an appliance electrically coupled to the power outlet; an external power delivery system electrically coupled to the power input and the appliance.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a backup power supply for appliances. The backup power supply provides batteries electrically coupled to a power cord for receiving power for charging the batteries and a power outlet for transmitting power for powering electrical equipment coupled to the power outlet. An inverter generator is operatively associated with the power cord, the batteries, and the power outlet in such a way that when the power cord experiences an electrical short the batteries switch from a reserve mode receiving power to a backup mode for transmitting power to the power outlet. The invertor generator is also adapted to sense reception of power through the power cord so as to switch from the backup mode to the reserve mode. Visible and audible indicators are provided for indicating the switching between the reserve mode and the backup mode.

Figure 1:
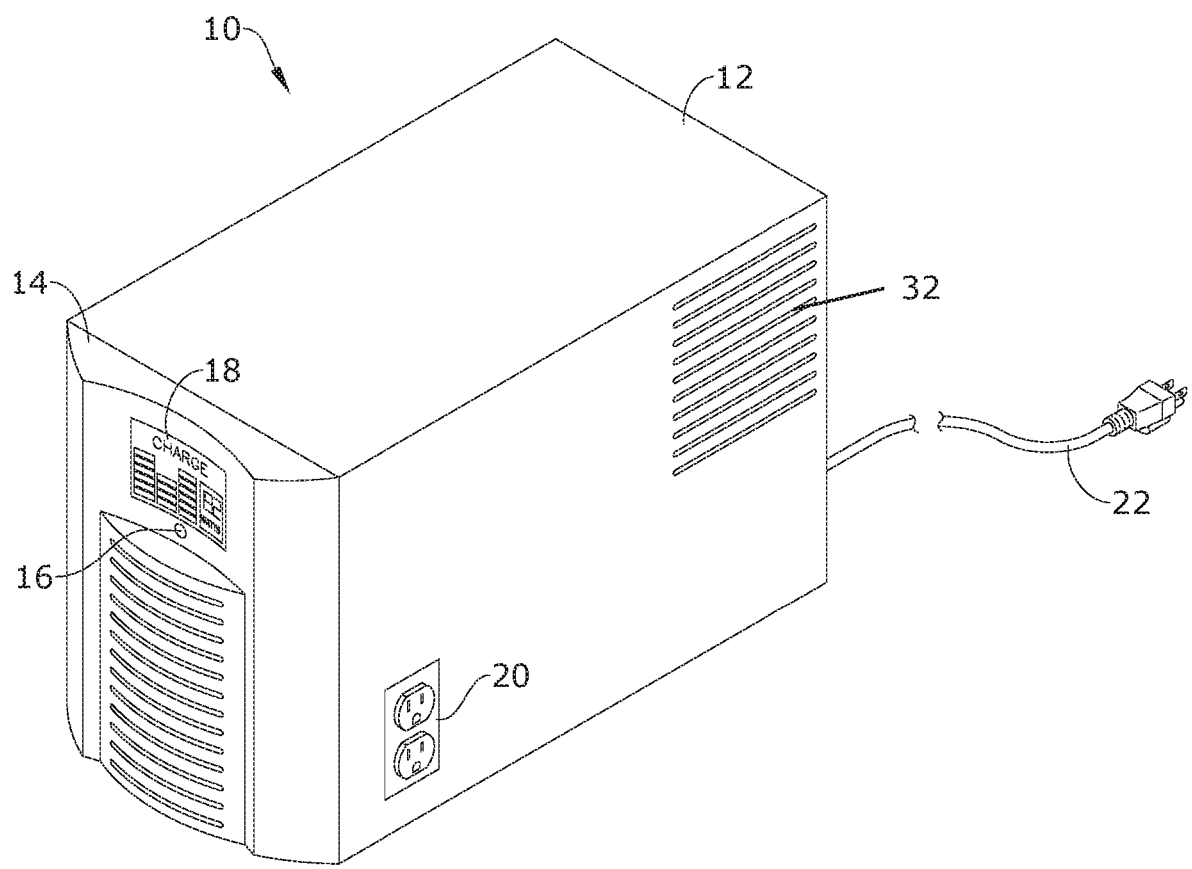
FIG. 1 is a perspective view of an exemplary embodiment of the present invention.
Figure 2:
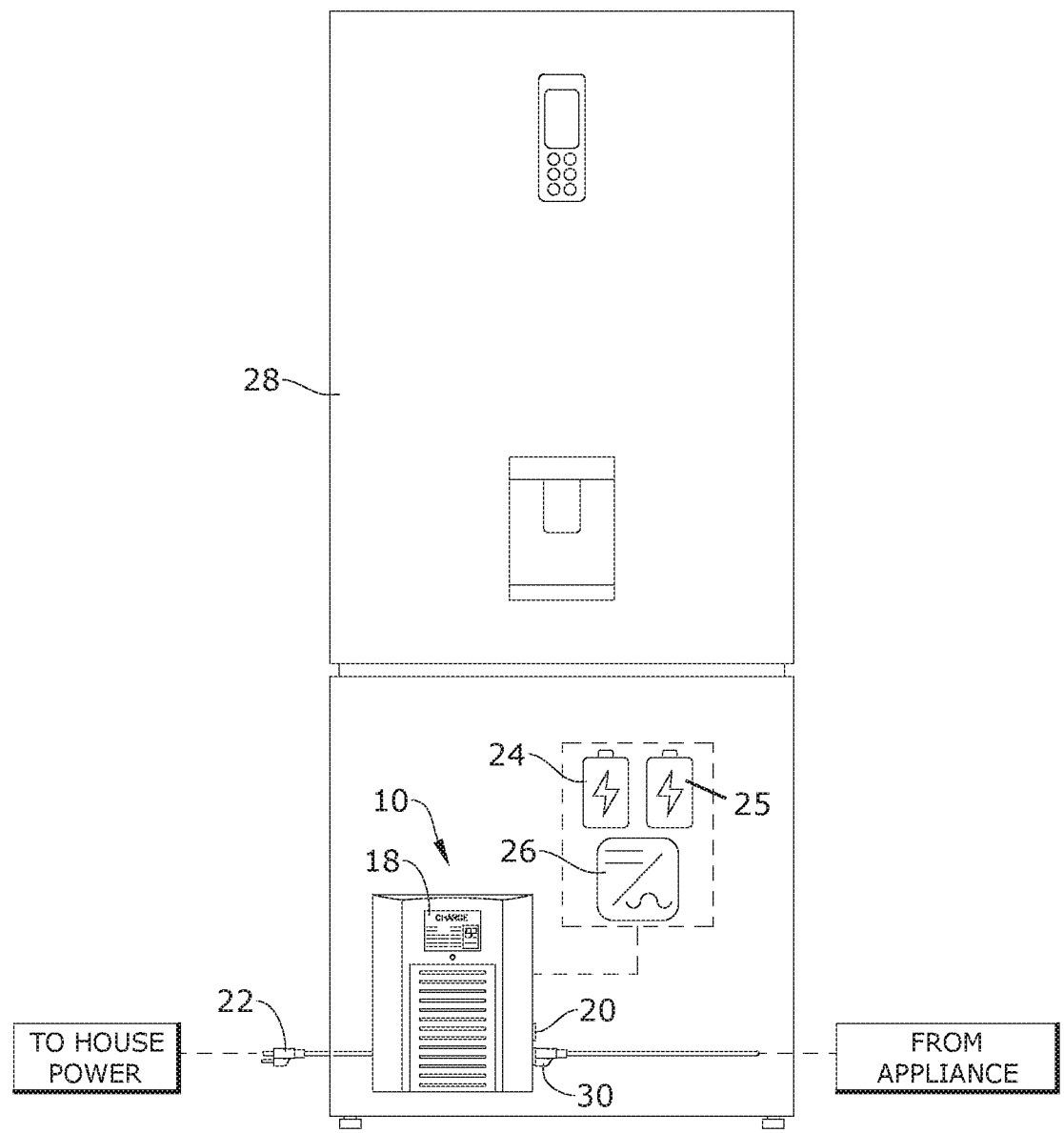
FIG. 2 is a schematic view of an exemplary embodiment of the present invention.
Figure 3:
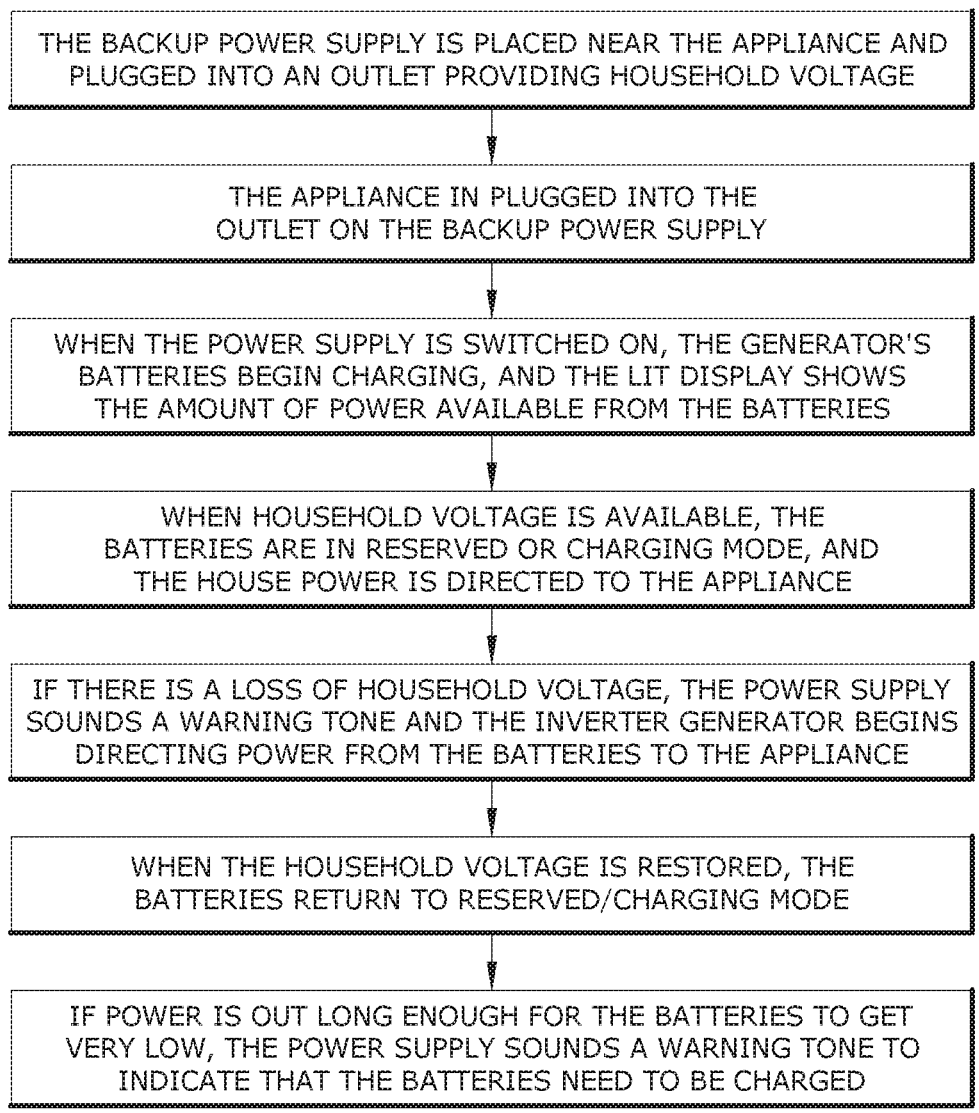
FIG. 3 is a flow chart of an exemplary embodiment of the present invention.

Referring to FIGS. 1 through 3, the present invention may include a backup power supply 10. The backup power supply 10 has a housing 12 defining an enclosure closed off by a front cover 14 that engages a periphery of the housing 12. The enclosure may house the following: electronic components data circuit boards; electronic components circuit wiring; electrical wiring; a first backup battery 24; a second backup battery 25; battery backup charging components; electronic digital lights; electronic digital lights wiring; an inverter generator 26 electrically connected to the first and second batteries 24 and 25; as well as a speaker and sound components. The front cover 14 and housing 12 protects the above-mentioned components.

The front cover 14 or housing 12 may provide a power switch 16, a display screen 18, a power outlet 20, a power cord 22 electrically coupled to the first and second backup batteries 24 and 25. The front cover 14 or housing 12 may include one or more air vents 32. The power outlet 20 and the power cord 22 may be 110 v rated, though can be other ratings so as to be compatible with local, external power delivery systems.

The front cover 14 and housing 12 may be made from plasticized or other materials sufficiently durable and insulative. The display screen 18 may be adapted to represent an activation of a power source charging and a time associated with how long remains on the charging cycle. The power cord 22 provides a plugin adapted to operatively associate with local outlets of the external power delivery system to plug into for receiving power. The power outlet 20 is dimensioned and adapted for receiving a power cord 30 and thereby electrically charging electrical equipment 28, such as an appliance—e.g., a refrigerator or a freezer.

The internal data circuit board may be adapted to help the device electronic components to function, while the electronic wiring for the data circuit board may be adapted to help give data to circuit board. Internal wiring for electrical power source may be adapted to give device components power and charging backup components associated with the first and second batteries 24 and 25. The first battery 24 works with the second battery 25 to help keep unit functioning when there is no external power source. And the second battery 25 works with the first battery 24 to help keep unit functioning when there is no external power source.

The digital lights may be adapted to indicate when power is on and how much power is left in the first and second batteries 24 and 25. When the backup power supply 10 is powered on an indicator light provided by the display screen 18 indicates powered on and how much charge the batteries 24 have to provide power to an electrically connected appliance 28 by way of the power outlet 20. The first and second batteries 24 may be on a reserved mode until the backup power supply 10 loses power transmission from the external power source (by way of its power cord 22) at which time the inverter generator 26 directs the first and second batteries 24 and 25 to electrically power the power outlet 20, in a backup mode, and thus electrically powers the electrically coupled appliance 28 (which would also lose power from the external power source outage). In certain embodiments, the backup power supply 10 may provide an audio and/or visible indicator of moving between the backup mode and the reserved mode. When the backup batteries 24 and 25 get very low a user may hear a constant beeping sound to indicate that the backup power supply 10 needs to be powered by an external power source again. The present invention emergency backup power supply 10 for refrigerator and freezers is a temporary power source during a power outage until the main power source is turned back on.

A method of using the present invention may include the following. The backup power supply 10 disclosed above may be provided. A user can use the backup power supply 10 to solve the problem of losing food during a power outage. The user can plug the backup power supply 10, by way of the power cord 22, in a (in certain embodiments, 110 v) wall outlet then push the backup power supply 10 on and off switch 16. The backup power supply 10 may light up to confirm to the user that the backup power supply 10 is on. Then the user can plug an appliance 28, by way of its power cord 30, to the power outlet 20. The backup power supply 10 should stay charged in a battery backup mode until the external (to the backup power supply 10 and the appliance 28) power goes out, and then the backup power supply 10 will make a beeping sound to let the user know that it is in battery backup mode, powering the electrically coupled appliance 28 by the batteries 24 and 25 until the external power is restored.

Additionally, the present invention can also keep other electrically powered equipment, such as a cell phone, during a power outage.

It should be understood, of course, that the foregoing relates to exemplary embodiments of the invention and that modifications may be made without departing from the spirit and scope of the invention as set forth in the following claims.

What is claimed is:

1. A backup power supply, comprising:
    a first battery and a second battery;
    a power input electrically coupled to the first battery and the second battery for power transmission thereto in a reserve mode;
    a power outlet electrically coupled to the first battery and the second battery for power transmission therefrom in a backup mode;
    an inverter generator electrically coupled to the first battery and the second battery;
    an audio indicator operatively associated with the inverter generator to produce an audio indication when the backup power supply switches between the reserve mode and the backup mode; and
    the inverter generator configured to switch from the reserve mode to the backup power mode if the power input is electrically shorted, wherein the inverter generator is configured to switch from the backup mode to the reserve mode if the power input is electrically powered.

2. The backup power supply of claim 1, further comprising a visible indicator operatively associated with the inverter generator to produce a visible indication when the backup power supply switches between the reserve mode and the backup mode.

3. The backup power supply of claim 2, further comprising:
    a housing for the the first battery and the second battery and the inverter generator; and
    a display screen for representing the visible indicator.

4. The backup power supply of claim 3, wherein the display screen is configured to representing a power transmission capacity of the the first battery and the second battery in the backup mode.

5. The backup power supply of claim 4, wherein the display screen is configured to representing a time remaining until the power transmission capacity reaches a predetermined level.

6. The backup power supply of claim 5, further comprising an appliance electrically coupled to the power outlet.

7. The backup power supply of claim 6, further comprising an external power delivery system electrically coupled to the power input.

8. The backup power supply of claim 7, wherein the external power delivery system is electrically coupled to the appliance.

9. The backup power supply of claim 8, wherein each battery is rechargeable.

\* \* \* \* \*